Sept. 5, 1967 P. B. WILLIAMS 3,340,362

CARD READER MONITORING AND ALARM SYSTEM

Filed Nov. 19, 1963 3 Sheets-Sheet 1

INVENTOR

Paul B. Williams

BY Moore, Hall & Pollock

ATTORNEYS

Sept. 5, 1967 P. B. WILLIAMS 3,340,362

CARD READER MONITORING AND ALARM SYSTEM

Filed Nov. 19, 1963 3 Sheets-Sheet 2

INVENTOR
Paul B. Williams

BY Moore, Hall & Pollock

ATTORNEY

INVENTOR

Paul B. Williams

BY Moore, Hall & Pollock

ATTORNEYS

United States Patent Office 3,340,362

Patented Sept. 5, 1967

3,340,362
CARD READER MONITORING AND ALARM SYSTEM

Paul B. Williams, 1010 Broad St., Newark, N.J. 07102

Filed Nov. 19, 1963, Ser. No. 324,661
4 Claims. (Cl. 179—5)

ABSTRACT OF THE DISCLOSURE

An alarm system including a card reader such as a card dialer telephone, and a solenoid control system for automatically sequencing the reader to read an address card and complete an information transmission circuit to a remote central station, and then to automatically transmit a message over the completed transmission circuit, all in response to the sensing of an emergency condition.

The present invention relates to an automatic "watchman" system adapted to monitor one or more preselected conditions, and, upon occurrence of predetermined changes in the monitored condition or conditions, adapted automatically to alert a central station of such change; and is more particularly concerned with such a watchman system wherein an address card, e.g., of the punched type, and a card reader are employed to select the station to be alerted.

In the form to be described hereinafter, the present invention is embodied in an automatic emergency fire alarm device responsive to changes of ambient temperature beyond a preselected limit, or to excessive rates of temperature rise, and adapted, upon occurrence of such circumstances, to automatically alert a local fire fighting facility of such conditions. However, as will appear hereinafter, and as will be apparent to those skilled in the art, the system of the present invention may be used in other environments and for other purposes, e.g., as an automatic burglar alarm, as an automatic process control apparatus, as an automatic inventory control (for example, in conjunction with a remote vending machine), et cetera. Moreover, in the form to be described hereinafter, the alarm is given by means of a telephone link employing a telephone of the card dialer type; but, as will also be apparent to those skilled in the art, other forms of card reader apparatus may be employed as addressing means.

Various arrangements have been suggested heretofore for giving a remote emergency alarm; and, in many cases, a telephone link has been used for such purpose. Certain of these prior telephone systems have contemplated, as a general matter, that a central governmental facility might be alerted to the existence of a fire or possible intrusion of a burglar by causing an alarm singal or pre-recorded message to be transmitted telephonically to that facility; but such systems have not found general favor or commerical acceptance for a number of reasons. They have, for example, generally been extremely complicated, whereby the monitoring and alarm equipment has, in many instances, been prohibitively expensive; and the complicated nature of these prior systems has, moreover, required constant maintenance and checking of the equipment to assure its continued operativeness, as intended, in event of an emergency. These structural complications, and the expense attendant manufacture, installation, and maintenance of prior equipments have been further aggravated by the fact that prior such devices, when used with a telephone, have, for the most part, been so designed that they either interfered with, or did not permit operation of the telephone in normal manner, whereby conversion of a local telephone to use as an alarm or monitoring equipment has in effect rendered the telephone inoperative for its normal purposes.

The foregoing disadvantages have been accompanied by even further complications and characteristics which rendered them generally unacceptable. In many instances, proper operation of telephonic alarm arrangements suggested heretofore has been completely dependent upon the continuance of normal electrical supplies in the facility being protected, and has been still further dependent for proper operation upon the continued existence of all portions of the monitoring equipment and circuits. Such prior equipments have, therefore, sometimes been rendered inoperative by the very emergency being monitored. For example, when a telephonic system is employed as a fire alarm, the very existence of a fire may cause disruption of pre-existing normal power supplies, and/or may cause destruction of sensors used in the first instance to detect the presence of the fire. Notwithstanding this, prior systems were often so arranged that if the house supply became inoperative and/or if some part of the telephonic alarm system was destroyed, the system was thereby rendered inoperative.

In addition to the foregoing deficiencies in the monitoring and alarm equipment itself, the overall warning and alarm systems employing those equipments has, in many instances, been such as to detract from general acceptance thereof. In some instances, for example, prior systems were designed around a complicated mechanical and/or audio electronic system adapted to alert either the telephone exchange operator or a predetermined phone station that an emergency exists; and in many instances, the system became effectively inoperative through failure of the telephone operator to reply immediately to a signal.

In solving the foregoing problems and avoiding the foregoing disadvantages, the present invention contemplates the provision of a novel, simple, dependable, and effective means for automatically transmitting information to a remote station, including the use of a card reader addressing mechanism which is automatically activated upon occurrence of an emergency condition to effect the transmission of a pre-recorded message to a remote station addressed by a card inserted into said reader. In its preferred embodiment, the card reader and infomation transmitter is combined in a telephone of the so-called automatic card dialer type, presently known per se. Such telephones are designed to make use of a card, analogous to "address" cards employed in other types of data processing systems, constructed of plastic or the like, and having telephone number (or "address") information disposed thereon, e.g., by appropriate punchings; and the telephone includes a card reader mechanism adapted, in response to initiation of a telephone call, to read the card and to automatically dial the number thereof. Such a telephone will, for purposes of the subsequent description and claims, be termed a "card dialer" telephone.

In accordance with the present invention, a card dialer telephone is associated in combination with a control mechanism adapted to respond to some predetermined condition being monitored, and further adapted either to insert an appropriate card into the telephone and complete a call therefrom, or to initiate a sequence of operations adapted to complete a call from a previously inserted such card. The system of the present invention further contemplates that the organization or facility being called would normally include a plurality of telephones, e.g., two telephones, assigned to handle only incoming alarm calls thereby virtually eliminating the possibility of a busy signal; and this particular consideration is highly to be preferred so that the complexity of the monitoring and control equipment can be appropriately reduced. However, as will also be apparent to those skilled in the art, a "busy signal sensor" could be readily incorporated into the equipment to recycle the control operation automatically upon occurrence of such a busy signal.

In accordance with further aspects of the present invention, the monitoring and alarm apparatus is so arranged that, upon occurrence of an emergency, a control system automatically removes from the circuit, or bypasses, those monitoring elements which initially sensed the emergency condition, whereby the alarm apparatus remains fully operative even if the monitoring apparatus should be destroyed or impaired by the condition being sensed. These characteristics of the system are further associated with an arrangement wherein occurrence of an alarm condition also serves to automatically insert an auxiliary self-contained power supply into the control system thereby rendering operativeness of the alarm independent of the continued existence of normal power supplies.

In its basic aspects, therefore, the main object of the present invention resides in the provision of a highly improved "watchman" system employing an automatically activated card reader type of addressing mechanism, as well as other features to be described, thereby to avoid various operational pitfalls and structural complexities and deficiencies which have characterized systems provided heretofore for similar purposes.

It is another object of the present invention to provide an improved automatically actuated remote watchman and/or alarm system utilizing a card reader addressing mechanism; and, more particularly, such a system utilizing a card dialer telephone.

A further object of the present invention resides in the provision of an automatic telephone alarm and/or information trensmission system which is simpler, more dependable, and more certainly effective under emergency conditions than has been the case heretofore.

Still another object of the present invention resides in the provision of an improved card dialer telephone alarm and/or information transmitting system which requires virtually no maintenance, but which nevertheless assures far greater reliability of operation than has been possible heretofore.

Still another object of the present invention resides in the provision of an automatic alarm and/or information transmitting system of the telephonic type so arranged that it in no way impairs or interferes with the normal intended usage of the telephone employed. In this respect, in its preferred form, the control system of the present invention comprises a separate unit associated with a card dialer telephone and adapted to automatically lift the telephone hand set or cradle to obtain a dial tone, followed by automatic depression of a start mechanism designed to effect card reading and telephone dialing. However, as will also appear to those skilled in the art, these functions, and the mechanisms for performing the same, can be incorporated directly into the telephone set itself if so desired, again without interfering with normal usage of the telephone.

Still another object of the present invention resides in the provision of an automatic telephonic alarm and/or information transmission system, preferably employing a card dialer telephone, so arranged and operative as to avoid service disruption due to the condition being monitored.

In providing for the foregoing objects, and advantages, the present invention contemplates, in its preferred embodiment, the provision of an automatic telephone alarm and/or information transmitting system employing a card dialer telephone of the type adapted to read a card inserted therein and thereafter adapted to automatically complete telephone circuits to the telephone number recorded on said card. This telephone arrangement is utilized in combination with a sensing and control system, to be described hereinafter, designed to respond to occurrence of some predetermined condition, e.g., a fire, and arranged, upon occurrence of said condition, to lift the telephone hand set and subsequently to initiate reading of a previously inserted "address" card, thereby to complete a call to a local fire station or other organization responsible for taking care of the emergency. As part of the system, two or more phones would be assigned by the functionally responsible organization to handle only incoming alarm calls, thereby virtually eliminating the possibility of a busy signal. The arrangement of a card dialer and sensor control system is associated with a sound reproducer apparatus, e.g., of the endless tape type, arranged to automatically and repetitively transmit a message to the facility being called, whereby the existence of a fire, unauthorized entry, or any other condition being watched is conveyed to the functionally responsible organization without human interposition.

In its use of a card dialer telephone, the present invention makes use of an instrument accepted per se in the industry as being highly effective and substantially foolproof in operation; and this, in conjunction with the uncomplicated design of the monitoring and control apparatus, assures that the overall system will operate with maximum reliability while requiring substantially no maintenance. The electronic circuits of the system are so designed that once the external alarm system has triggered the device, an auxiliary power supply is actuated so that in the event the external power supply is interrupted, the device will continue to operate as planned. The auxiliary power supply thus actuated can take the form of a wet cell battery maintained automatically by a trickle charger. The device is so designed that the phone can be used and operated in its normal manner, with the alarm system in no way interfering with such use. Moreover, the basic concept behind the control mechanism employed to selectively activate the phone and its card reader is such that such a control mechanism may be easily incorporated directly into the telephone unit if desired, so that, aside from the external sensing device and an audible alarm, one may dispense entirely with external supplementary material connected to, or adjacent to, the telephone itself.

The foregoing objects, advantages, construction and operation of the present invention will become more readily apparent from the following description and accompanying drawings, in which.

Figure 1:
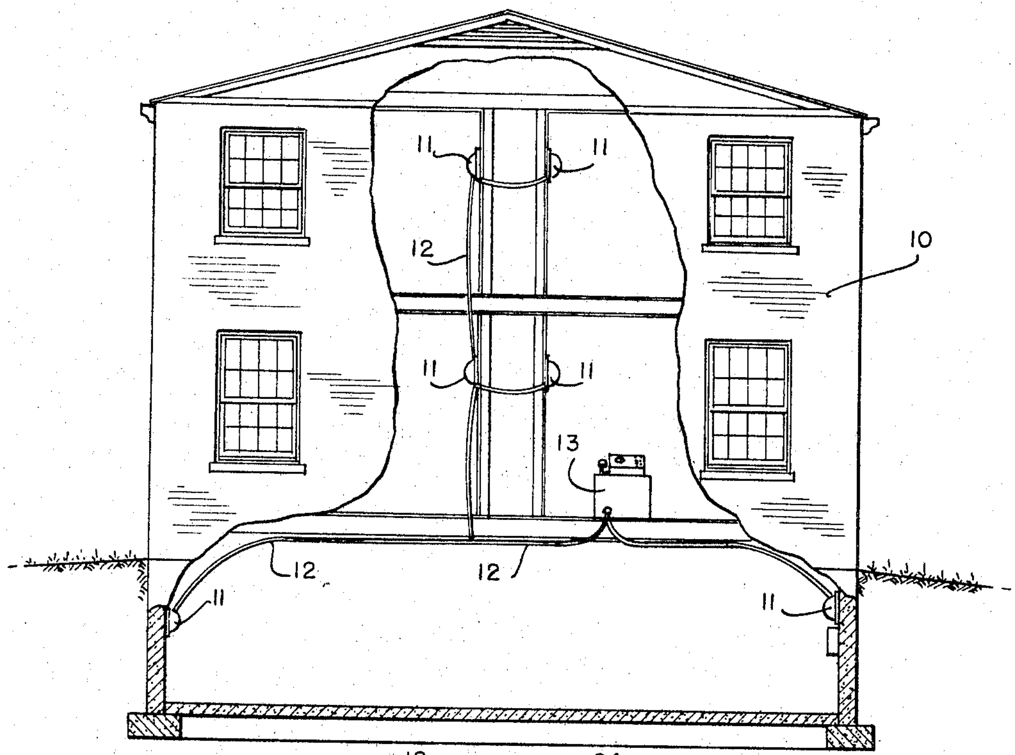
FIGURE 1 is an illustrative view of a monitoring and alarm system constructed in accordance with the present invention, as installed in a building structure.

Referring first to FIGURE 1, it will be seen that, in accordance with the present invention, a building unit 10, such as a house, can be provided with a plurality of condition monitors or sensors 11 disposed in the ceiling, walls, or other portions of various rooms, and interconnected in parallel to one another by cable means 12 ultimately coupling the condition monitors 11 to a card reader station 13 arranged to selectively transmit an emergency message. The condition monitors 11 may take various forms adapted to sense various different conditions; and, in the particular embodiment to be described hereinafter, the several monitors 11 take the form of commercially available temperature sensors, e.g., of the bimetallic type, sensitive temperatures in excess of a predetermined fixed limit and/or to a sudden rate of rise in temperature. It will be appreciated, however, that the monitors 11 may take other forms, such as conventional burglar detection devices, photoelectric detectors, infra red detectors, radio frequency devices, trip wires, etc. In any event, the sensors or monitors 11 employed ultimately act as a triggering device operative to initiate the control sequence which characterizes the present invention.

Figure 2:
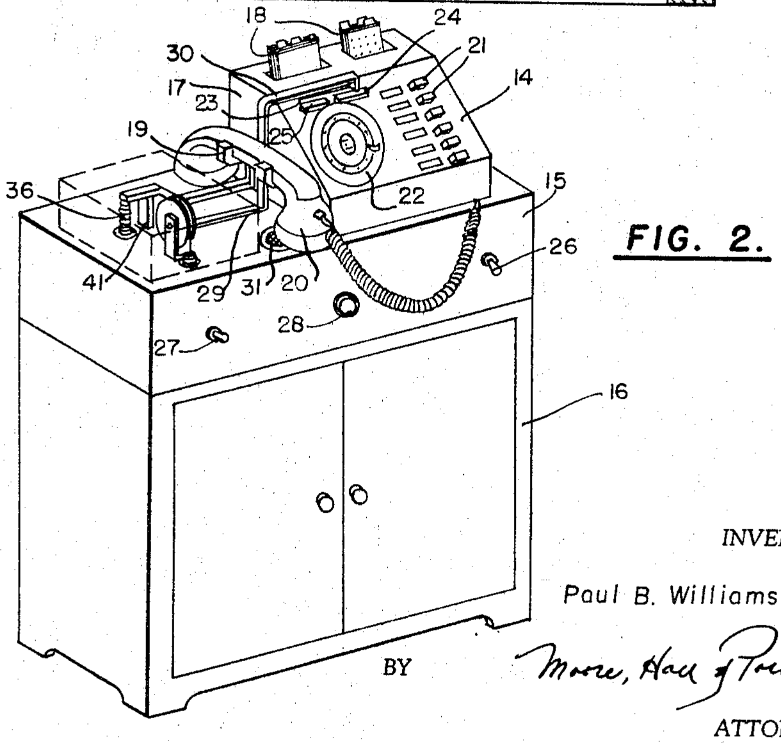
FIGURE 2 is a perspective view of a card reader control unit of the type utilized in the arrangement of FIGURE 1.

Card reader station 13 is shown in somewhat greater detail in FIGURE 2 and comprises, in the embodiment of the present invention to be described hereinafter, three essential parts: a card dialer telephone 14, a control unit 15, and a console 16. The card dialer telephone 14 is in itself conventional and comprises a main telephone housing 17 provided with recesses for storing therein a plurality of punched cards 18. Cards 18 are individually of plastic construction, or the like, and are punched (or adapted to be punched) to provide a pattern of holes therein characteristic of some particular number to be dialed. The telephone unit further includes a cradle 19 supporting a handset 20 thereon which must be lifted to obtain a dial tone preparatory to initiating a call sequence. As is known to those skilled in the art, the unit, in addition to being provided with various station buttons 21 and a conventional dial 22, is also provided with a slot 23 into which one of the cards 18 (shown at **18*a* in FIGURE 3) may be inserted when it is desired to complete a call automatically. To this effect, the telephone 14 is further provided with a start button 24 and with a release button 25** used during an automatic card dialing procedure.

In the normal operation of the card dialer telephone 14, a particular plastic card **18*a* is first inserted into the slot 23, whereafter the handset 20 is lifted to release cradle 19 and obtain a dial tone. The start button 24 is then depressed, thereby actuating a reader mechanism forming a portion of telephone 14 and located within housing 17, which reader scans the punchings in the selected card 18*a*** and automatically completes the call.

The foregoing call initiating sequence is accomplished, in the present invention, by mechanisms forming portions of control unit 15; and, as will become more readily apparent, the unit 15, in addition to being provided externally with an on-off start switch 26, a test switch 27 and a pilot light 28, is provided with a pair of relay controlled solenoids (32 and 33, to be described) operative ultimately to move, in proper time spaced sequence, a handset cradle lifting lever 29 and a card reader start lever 30. The control unit 15 may also include, as will become apparent hereinafter, a power supply and endless tape recorder unit giving an alarm signal or message via sound opening 31 located in the upper surface of chassis 15 at a position adjacent the mouth piece of handset 20.

Console 16 may contain one or more auxiliary power supplies, e.g., of the wet cell chargeable type; and is provided also to house various portions of the electronic control equipment of the present invention, to be described hereinafter.

Figure 3:
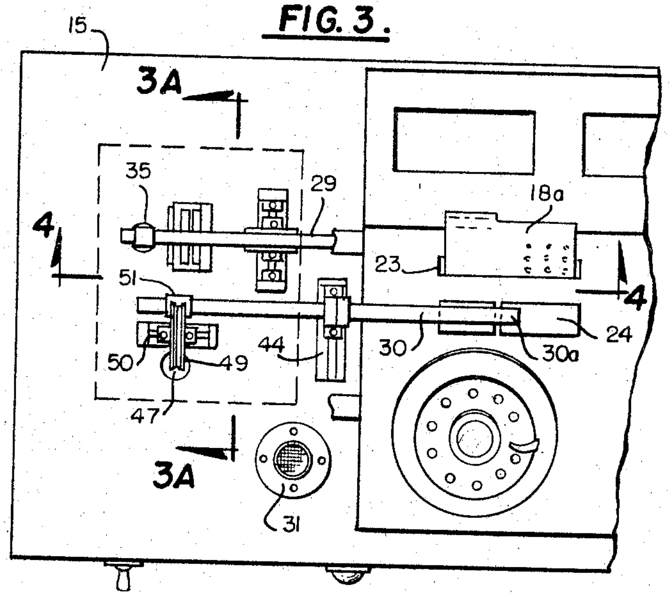
FIGURE 3 is a top view of the unit shown in FIGURE 2.
Figure 3A:
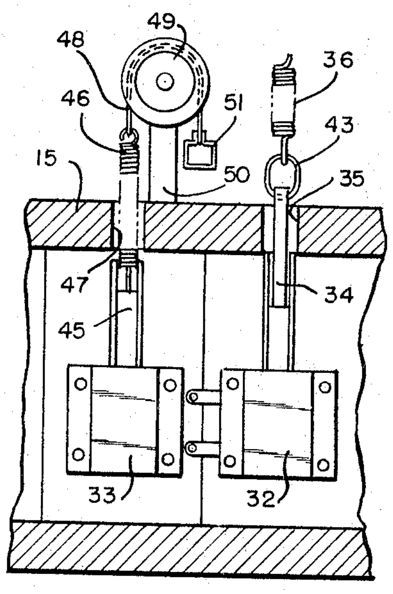
FIGURE 3A is a view, partly in section, taken on line 3A—3A of FIGURE 3.
Figure 4:
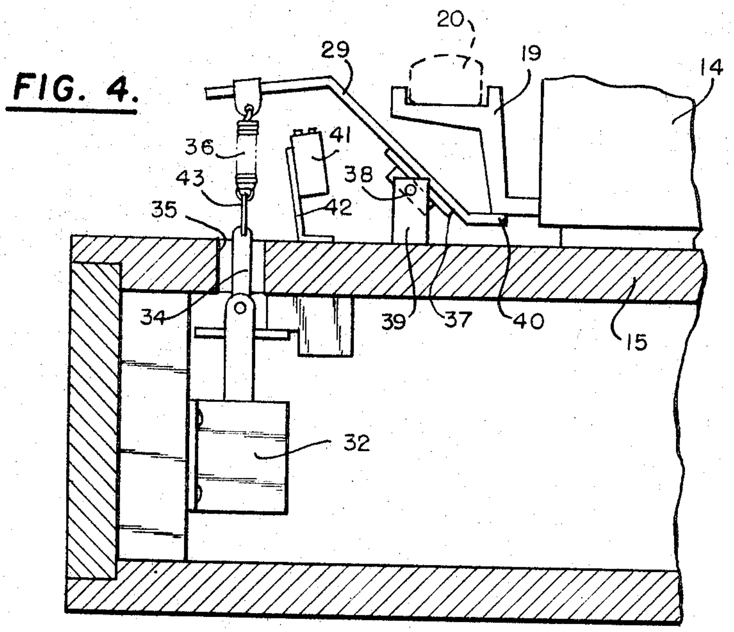
FIGURE 4 is a view, partly in section, taken on line 4—4 of FIGURE 3.

Before proceeding with a detailed description of the electrical portions of the present invention, attention is invited to FIGURES 3, 3A and 4 which show various mechanical aspects of the present invention. Control unit 15 contains, inter alia, a pair of solenoids 32 and 33 which are adapted to be energized at particular times and in a particular sequence to move levers 29 and 30 in like sequence, thereby to lift the telephone cradle 19 and thereafter to depress the telephone start bar or button 24. Solenoid 32 is connected via a shaft 34, passing through an aperture 35 in the top of control unit 15 and thence by a spring 36, to an outermost end of cradle lifting lever 29. Cradle lifting lever 29 is in turn held in position by a pillow block 37 which is pivoted at 38 in a bracket 39 (see FIGURE 4); and said lever 29 further includes an end 40 underlying the telephone handset cradle 19 (see especially FIGURE 4) whereby retraction of solenoid 32 causes the end 40 of lever 29 to be moved in a counter clockwise direction about pivot 38 thereby to lift cradle 19.

A permanent magnet 41 mounted on a bracket 42 is provided below a portion of lever 29 to act as a latching mechanism for holding lever 29 in its actuated position once solenoid 32 has been energized. As a result, solenoid 32, after initially being energized, can thereafter be de-energized without affecting continued operation of the overall system. This structural feature is of particular value since, as will appear hereinafter, solenoid 32 is initially energized by an AC supply. The alternating flux of solenoid 32 accordingly might produce a buzz and increase ambient noise, and might indeed possibly erase a pre-recorded tape message and/or might demagnetize latch 41, if solenoid 32 were continuously energized by such alternating current throughout the control and message relaying operation, to be described. The provision of permanent magnet latch 41 thus permits solenoid 32 to be de-energized once it has served its purpose of effecting initial rotation of lever 29, thereby avoiding all of these undesirable results and further avoiding possible difficulty if the solenoid energization supply should be destroyed or impaired by reason of a fire or other emergency.

The shaft 34 interconnecting solenoid 32 with lever 29 via spring 36 is formed of Lucite and is preferably attached to said spring 36 by means of a stainless steel clip 43, thereby to further isolate the alternating current field generated by solenoid 32 from permanent magnet latch 41.

The card reader start lever 30 has an end **30*a* which rests lightly upon the start button or bar 24 of the telephone unit (see FIGURE 3); and said lever 30 is positioned for pivotal motion by a pillow block and shaft in a bracket 44. Pivotal motion of the start bar 30 is effected by the aforementioned solenoid 33 having a plunger 45 connected to a light gauge stainless steel woven cable 48 by means of a spring 46 passing through an opening 47 in unit 15. Cable 48 passes over a ball bearing pulley member 49, mounted by a bracket 50, upon unit 15, to a band 51 encircling the end of starting lever 30 remote from end 30*a* thereof. Energization of solenoid 33, with consequent retraction of its plunger 45, thus causes upward movement of band 51 and downward movement of end 30*a* of start bar 30** about its pivotal mounting.

By the mechanical arrangements thus illustrated in FIGURES 3, 3A and 4, energization of solenoid 32 operates to lift the handset cradle so as to obtain a dial tone, whereas subsequent energization of solenoid 33 operates to depress start bar 24. Since lever 29 is held in position by permanent magnet latch 41, and since, in addition, a card reading cycle initiated by depression of start bar 24 is continued even when the start bar is thereafter released, both of solenoids 32 and 33 can be de-energized after their initial energization without affecting proper operation of the device.

Figure 5:
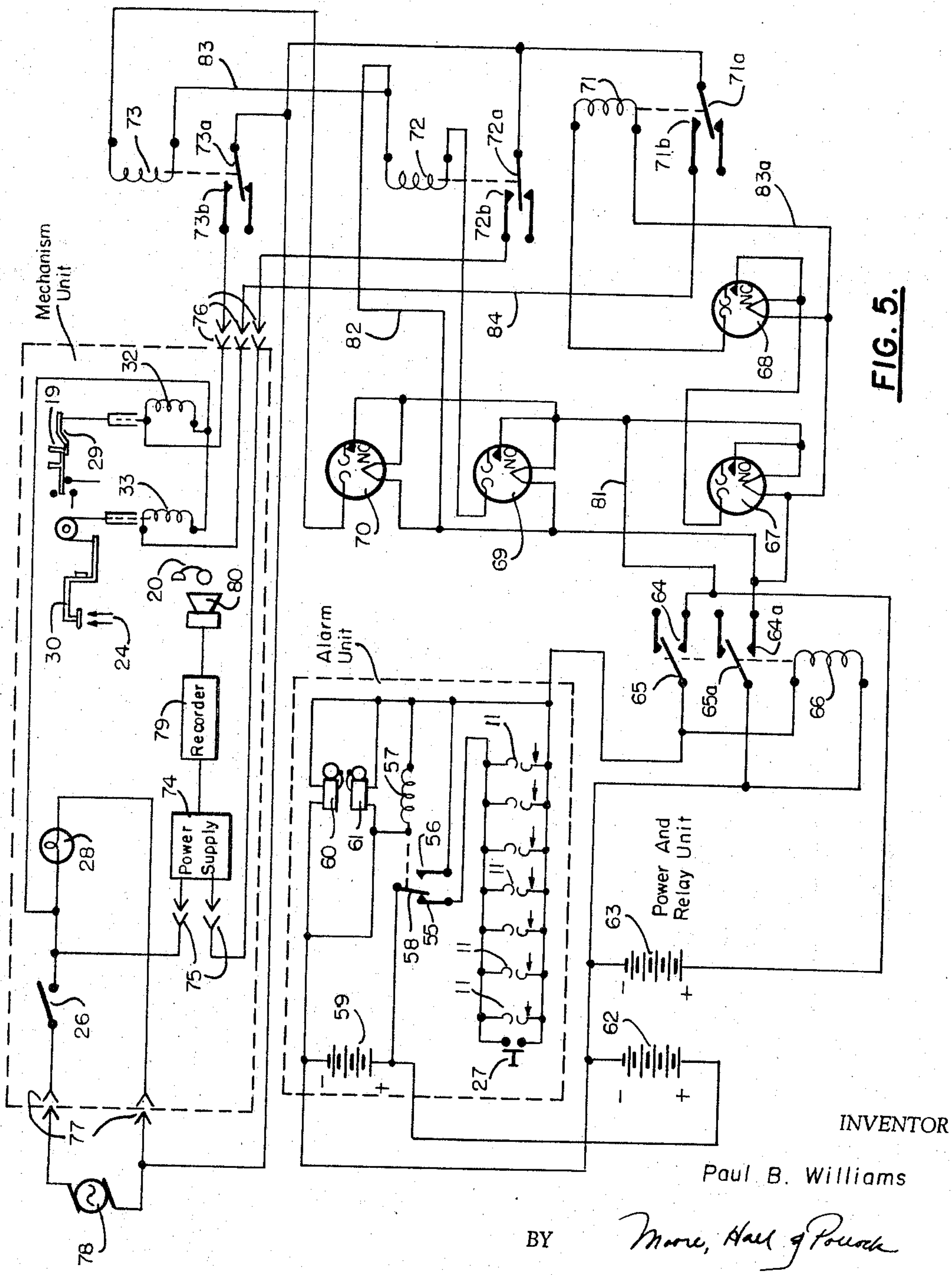
FIGURE 5 is a schematic diagram of the monitoring, alarm and control system of the present invention.

The aforementioned energization and de-energization of solenoids 32 and 33, and the other control operations which characterize the present invention, will be best appreciated by reference to the schematic diagram of FIGURE 5. The overall system can, insofar as functional purposes are concerned, be divided into three basic units, designated the "alarm unit" (segregated by dotted lines in FIGURE 5), the "mechanism unit" (also segregated by dotted lines in FIGURE 5), and the "power and relay unit" comprising the remainder of the circuit shown in FIGURE 5. The alarm unit comprises the various monitors or sensors 11 described previously, connected in parallel with one another and also connected in parallel with test switch 27. Test switch 27 (see FIGURE 2), rather than being connected into the circuit as shown in FIGURE 5, may in the alternative be used with a meter (not shown) to permit testing of the various power supplies.

In the FIGURE 5 arrangement, interconnected sensors 11 and test switch 27 have their opposing sides connected to a pair of contacts 55–56, associated with a relay coil 57 and with relay switch blade 58 positioned normally to be in engagement with contact 55. One side of relay coil 57 is connected to the negative terminal of a first power supply 59 and is also coupled to one side of each of a pair of alarm bells 60 and 61. The other side of relay coil 57 is coupled to the other side of alarm bells 60 and 61 as well as to relay contact 56 and the lower side of sensors 11. Alarm bells 60 and 61 are effectively in parallel with one another. Two such alarm bells are provided as a safety measure to assure that an audible alarm will be sounded, even if one of bells 60 or 61 should be impaired or destroyed; and, in practice, the two bells 60 and 61 are preferably spaced from one another by a significant distance.

Switch blade 58 associated with relay coil 57 is coupled to the positive side of power supply 59 as shown. In addition, a second power supply 62 is connected in parallel with power supply 59 at a position remote from the alarm unit, so that any impairment or destruction of either unit 59 or 62 will still permit proper operation of the system. A third power supply 63 is also provided, the negative side of which is coupled to the negative sides of power supplies 59 and 62, and the positive side of which is coupled to a contact 64 associated with a switch blade 65 selectively actuated by a relay coil 66 connected in parallel with the aforementioned relay coil 57. This arrangement serves, as will be described, to place the third power supply 63 in parallel with power supplies 59 and 62 upon occurrence of an emergency condition as sensed by monitors 11, so that even if both power supplies 59 and 62 should somehow become destroyed, a power supply will still be available to permit normal operation of the system. As will become apparent, this third power supply 63 is automatically inserted into the circuit by initiation of the control and alarm sequence; and, as will also be apparent, auxiliary supply 63, or a similar such supply, may also be automatically switched into the circuit to replace or supplement supply 78, to be described.

All these various switching operations, and others to be described, are effected by appropriate switch blades and contacts on relays employed in the "power and relay unit," which switches and contacts will be more fully described subsequently as description of the operation proceeds. In this respect, the power and relay unit further includes a normally open three-second time delay relay 67; a normally closed four-second time delay relay 68; a normally open fifteen-second time delay relay 69; and a normally closed five-second time delay relay 70, all of which are interconnected to one another and to a plurality of power relays 71, 72 and 73 in the manner specifically illustrated in FIGURE 5. All of the relays 57, and 66 through 73 inclusive are conventional and commercially available; and, in particular, the time delay relays 67 through 70 inclusive are of the known type comprising a bimetallic element which is heated by a filament to open (or close) after a prescribed period of time subsequent to energization of said filament. As will appear hereinafter, the various delays afforded by the time delay relays 67 through 70, inclusive, differ to provide a desired sequence of operation.

In addition to the foregoing elements, comprising the alarm unit and the power and relay unit, the "mechanism unit" shown in FIGURE 5 comprises the solenoids 32 and 33 already described, associated with the levers 29 and 30 operating in conjunction with the telephone handset, as well as the on-off switch 26 and the pilot light 28 all described previously. The unit further includes a transistorized power supply 74 coupled via separable jack and plug connectors 75, 76 and 77 to the "alarm unit," to the "power and relay unit," and to an external source of alternating current supply 78. The various jack and plug connectors 75, 76, 77 are provided to permit convenient assembly of the various units. The mechanical unit further includes a recorder 79 which may comprise an endless magnetic tape having a pre-recorded message thereon, advising, for example, of the existence of a fire, with the output of recorder 79 being coupled to a speaker

80 mounted to reproduce said message directly into the mouth piece of handset 20, e.g., via the previously described opening 31.

In order to understand the operation of the device, as well as the nature of the various interconnections shown in FIGURE 5, let us assume that on-off switch 26 is closed, but that no emergency condition is being sensed. In the form illustrated, when used as a fire alarm, a proper card 18*a* having punched data thereon corresponding to the fire emergency number would have been previously inserted into the telephone slot 23; or, if the equipment were being used as a burglar alarm, a card corresponding to some police facility would have been earlier inserted in place. The closure of switch 26 couples power from external source 78 via connector 77 to pilot light 28 thereby indicating that the equipment is "on"; and also couples power to one side of transistorized power supply 74, as well as to one side of solenoids 32 and 33. The apparatus is now in a stand-by condition.

If an emergency condition should arise (or if test switch 27 should be depressed for purposes of testing the equipment), a circuit will be completed from one to the other side of the parallel sensor arrangement comprising bimetallic switches 11 and switch 27. This in turn completes a circuit from the positive side of parallel supplies 59 and 62 (which may be of the wet cell type, maintained at full charge by a trickle charger) through relay switch blade 58, contact 55, the closed sensor 11, and thence via both of relay coils 57 and 66, as well as via both of alarm bells 60 and 61, to the negative side of the parallel supplies 59 and 62. The sensing of an emergency condition thus immediately sounds both of alarms 60 and 61, and simultaneously effects current flow through both of relay coils 57 and 66.

The current flow through relay coil 57 causes switch blade 58 to break at contact 55 and to make with contact 56. This switching operation accomplishes the function of completing holding circuits across both of relay coils 57 and 66 (e.g., from the positive side of batteries 59 and 62, through blade 58, contact 56, and coils 57 and 66, to the negative side of supplies 59 and 62). At the same time, the various sensor units 11 are, by reason of movement of switch blade 58 away from contact 55, effectively removed from the control circuit so that if said sensors should become destroyed or impaired, such an occurrence will in no way affect operation of the system.

The holding circuit thus made across coil 57 assures that alarm bells 60 and 61 continue to be energized and that sensors 11 are kept out of the circuit.

The holding circuit made across coil 66, moreover, maintains current flow through said relay coil 66. This current flow causes a switching of both relay blades 65 and 65*a*, so that said switch blades make with contacts 64 and 64*a*. This particular switching operation (which occurs, of course, as soon as any sensor 11 closes) completes a circuit from the negative side of auxiliary supply 63 through relay coil 66, switch blade 65, and fixed contact 64 to the positive side of auxiliary supply 63; and also completes a circuit from the interconnected positive sides of supplies 59 and 62 through switch blade 58, contact 56, and relay coil 66 to the positive side of supply 63. Since the negative sides of supplies 59, 62 and 63, were all previously interconnected, the operation of switch blade 65 and its associated contact 64 in effect places power supply 63 into the circuit in parallel with power supplies 59 and 62, and this switched connection is maintained by the holding circuits for relay coil 66, previously described.

To summarize the entire sequence thus far described, it will be appreciated that, upon occurrence of an emergency condition, as sensed by sensors 11, the system operates to automatically sound audible alarms 60 and 61, and also operates to energize various relays and holding circuits therefor, so as to switch an auxiliary power supply 63 into the circuit, and to switch the condition sensors 11 out of the circuit.

The energization of relay coil 66, in addition to achieving the operations described above, moves a second switch blade 65a into engagement with contact 64a, so as to complete a circuit from the negative side of the interconnected power supplies 59, 62, 63, to one side of the filament heaters in each of the time delay relays 67, 68, 69, and 70. The opposite sides of the heaters in time delay relays 67, 69, and 70 are interconnected to one another and, via line 81, are connected to the positive sides of the power supplies 59, 62 and 63. As a result, the switching of blade 65a initiates current flow through the heaters of each of relays 67, 69, and 70. It should be noted, however, that since the filament circuit for time delay relay 68 is completed via the normally open contacts of time delay relay 67, the heater of relay 68 is not yet energized.

Closure of switch blade 65a, in addition to energizing relays 67, 69, and 70, completes a circuit from the negative sides of power supplies 59, 62, 63 via said blade 65a and contact 64a to line 82 which is in turn connected via line 83 to one side of relay coil 73. The opposite side of relay coil 73 is connected through the normally closed contact of five-second time delay relay 70 to line 81 of said relay 70 (and thereby to the inter-connected positive sides of power supplies 59, 62, and 63). Closure of switch blade 65a thus causes energization of relay 73 via normally closed time delay relay 70. This energization of the coil in relay 73 in turn moves its switch blade 73a into engagement with fixed contact 73b, so as to complete a circuit from the lower side of power supply 78 through blade 73a, contact 73b, solenoid coil 32, and on-off switch 26 to the other side of power supply 78. Solenoid 32 is accordingly immediately energized by the AC supply 78 to lift the cradle 19 of the telephone handset 20, thereby to obtain a dial tone. This lifting of the handset cradle, moveover, causes latching thereof by means of the previously described permanent magnet 41, whereafter solenoid 32 can be de-energized. Such solenoid de-enerization is, in fact, accomplished after a five-second delay by the opening of the normally closed contacts in time delay relay 70, which serves to de-energize relay coil 73, thereby breaking the circuit to solenoid 32. The purpose of the de-energization of solenoid 32 has been described previously.

The current flowing through the filament of three-second time delay relay 67 causes closure of its normally open contacts after a three-second interval; and this closure of the normaly open contacts in relay 67 in turn completes the filament circuit for normally closed five-second time delay relay 68. Current now flows from the interconnected negative sides of the supplies 59, 62 and 63 through blade 65a and contact 64a, line 83a, relay coil 71, and thence through the normally closed contact of relay 68, and through the now closed contact of relay 67, to line 81 coupled to the interconnected positive sides of said power supplies. Relay coil 71 accordingly is energized so that its switch blade 71a makes with contact 71b, thereby completing a circuit from the lower side of AC supply 78 through blade 71a and contact 71b to line 84, and thence via the central element of jack and plug connector 76 through solenoid coil 33 and on-off switch 26 to the other side of supply 78.

Solenoid 33 is thereby energized, and operates to move starting lever 30 into engagement with the card reader start bar 24 of the telephone 14. This engagement of the start bar occurs so long as solenoid 33 is energized. Solenoid 33 becomes deenergized after an interval corresponding to the time delay of relay 68, after which interval, the normally closed contacts of relay 68 open, thereby deenergizing relay 71, and in turn deenergizing solenoid 33. In this second control operation, therefore, it will be noted that, whereas the solenoid 32 was energized immediately via relay 70 to lift the telephone handset and secure a dial tone, energization of solenoid 33 (and depression of the reader start bar) was delayed for three-seconds by operation of relay 67, whereafter said solenoid 33 was automatically energized and thereafter de-energized for a total energization period of five-seconds by the operation of the relay 68. The delay preceding energization of solenoid 33 may, if desired, be made responsive to a sensing device, listening for occurence of a dial tone; but this represents a complication which is not ordinarily necessary since a dial tone will substantially always be obtained within the eight second period provided by relays 67 and 68.

In the overall sequence of operation for the relays thus far described, therefore, the telephone cradle is first lifted; a time delay is then provided to assure obtaining of a dial tone; the start bar is thereafter depressed to commence the card reading operation, and is, after a further period, released; and the solenoids 32 and 33 are both de-energized to avoid the disadvantages of continued AC energization thereof already described.

The time delay relay 69 is selected to provide a fifteen second delay so as to permit the various control operations described above to occur in their intended sequence. After this period of delay, e.g., of fifteen seconds, the normally open contacts of time delay relay 69 close, thereby completing a circuit between lines 81 and 82 (across the power supplies 59, 62, and 63) through relay coil 72. This in turn moves switch blade 72a into engagement with contact 72b to complete a circuit from the lower side of power supply 78, through blade 72a, contact 72b, via the lowermost portions of connector elements 76 and 75 to power supply 74, and thence via the upper portion of connector 75 and on-off switch 26 to the upper side of power supply 78. Power supply 74 is, thereby, rendered operative, and it in turn activates message tape recorder 79 so as to provide the desired message via speaker 80 into the telephone handset 20. The message, contained for example on a pre-recorded endless tape loop, repetitively announces the nature and location of the emergency (or of any other condition, e.g., that a remote vending machine needs refilling) into the telephone transmitter, which has been placed into direct contact wtih the desired receiving station. This message transmission continues until the entire unit is turned off manually.

While I have thus described a preferred embodiment of the present invention, many variations will be apparent to those skilled in the art and certain of these variations have in fact been described. The present description is, therefore, meant to be illustratative only, and should not be considered limitative of my invention, and all such variations and modifications are intended to fall within the scope of the appended claims.

Having thus described my invention, I claim:

1. In combination, an alarm system comprising a card dialer telephone having a liftable handset cradle as well as a card reader selectively operative upon depression of a manual start switch to read a data card inserted therein, said card dialer telephone having a card therein bearing data identifying a receiving station to be alerted upon occurrence of an emergency condition, a first solenoid, a first lever actuable by said first solenoid and positioned to lift said handset cradle upon energization of said first solenoid, a second solenoid, a second lever actuable by said second solenoid and positioned to depress said manual start switch upon energization of said second solenoid, sensor means for continuously monitoring a preselected parameter, control means coupling said sensor means to both said solenoids for energizing said first and second solenoids in a time spaced sequence thereby to render said reader operative upon occurrence of said emergency condition, said control means including means for automatically de-energizing each of said solenoids at an interval of time subsequent to their energization, and latch means for holding said handset cradle in its lifted position notwithstanding de-energization of said first solenoid.

2. The combination of claim 1 wherein said latch means comprises a permanent magnet disposed adjacent said handset cradle.

3. In combination, an alarm system comprising a card dialer telephone having a liftable handset cradle, selectively operable audio means disposed adjacent said cradle for automatically reproducing a message, said card dialer telephone including a punched card reader and a manually operable switch for initiating operation of said card reader thereby to read a punched card previously inserted into said reader, said card dialer telephone card reader having a card therein bearing punched data identifying a receiving station to be alerted upon occurrence of an emergency condition, first control means comprising first time delay relay means and a first solenoid, a first lever actuable by said first solenoid and positioned to lift said handset cradle upon energization of said first solenoid under the control of said first time delay relay means, second control means comprising second time delay relay means and a second solenoid, a second lever actuable by said second solenoid and positioned to operate said manually operable switch upon energization of said second solenoid under the control of said second time delay relay means, a source of alternating current for selectively energizing said first and second solenoids, third control means for selectively initiating operation of said audio means, sensor means for continuously monitoring a preselected parameter, and means responsive to detection of said emergency condition by said sensor means and coupled to said first, second, and third control means for energizing said first and second solenoids from said alternating current source and for initiating operation of said audio means in a predetermined time spaced sequence thereby to render said reader operative followed by transmission of said message via said telephone to said receiving station, said last-named means including means for automatically disconnecting each of said solenoids from said alternating current source at an interval of time subsequent to their energization thereby to avoid alternating current interference with the transmission of said message.

4. In combination, an alarm system comprising a card dialer telephone having a liftable handset cradle as well as a card reader and start mechanism therefor selectively operative to effect reading of a data card inserted into said telephone, said card dialer telephone having a card adjacent the reader thereof bearing data identifying a receiving station to be alerted upon occurrence of an emergency condition, first solenoid means selectively operable to lift said handset cradle, second solenoid means selectively operable to actuate said start mechanism to initiate reading of said card, sensor means for continuously monitoring a preselected parameter, and control means coupled to said sensor means for selectively energizing said first and second solenoid means in response to the sensing of an emergency condition, said control means including switching relay means operated in response to the sensing of an emergency condition by said sensor means for disconnecting said sensor means said control means also including further relay means operated in response to operation of said switching relay means for thereafter operating said first and second solenoid means in a time spaced sequence to render said reader operative.

References Cited

UNITED STATES PATENTS

| | | | |
|---|---|---|---|
| 2,768,239 | 10/1956 | Foster et al. | 179—5 |
| 3,136,855 | 6/1964 | Provost | 179—5 |
| 3,189,692 | 6/1965 | Andregg et al. | 179—90.2 |
| 3,287,500 | 11/1966 | Moore | 179—5 |

JOHN W. CALDWELL, *Acting Primary Examiner.*

ROBERT L. GRIFFIN, DAVID G. REDINBAUGH, *Examiners.*

W. S. FROMMER, *Assistant Examiner.*